(Model.)
S. A. CUNINGHAM.
LUNCH RECEPTACLE AND MUFF.
No. 255,420.          Patented Mar. 28, 1882.
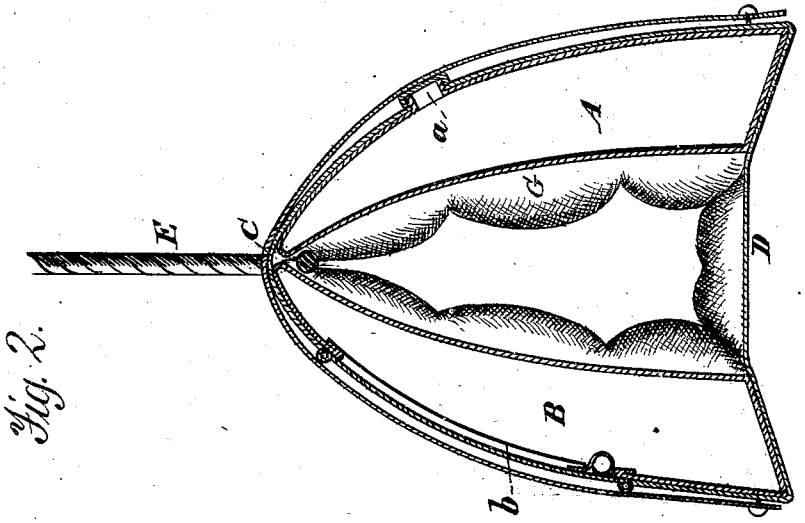
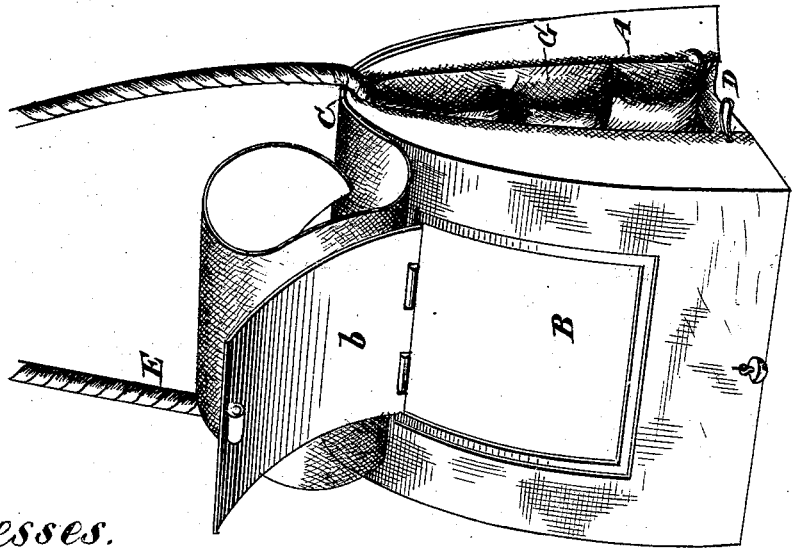
Witnesses.
A. Ruppert.
Harry Bernhard.
Sarah A. Cunningham
Inventor.
Per Edson Bros.
Attorneys

UNITED STATES PATENT OFFICE.

SARAH A. CUNINGHAM, OF NEW YORK, N. Y.

LUNCH-RECEPTACLE AND MUFF.

SPECIFICATION forming part of Letters Patent No. 255,420, dated March 28, 1882.

Application filed January 24, 1882. (Model.)

*To all whom it may concern:*

Be it known that I, SARAH A. CUNINGHAM, (late Sarah A. Moody,) a citizen of the United States, residing at New York, in the county of New York and State of New York, have invented a new and useful Lunch-Receptacle and Muff, of which the following is a specification, reference being had therein to the accompanying drawings.

My invention relates to a combined lunch-receptacle and muff; and the novelty consists in the construction, combination, and adaptation of parts, as will be more fully hereinafter set forth and claimed.

In large cities and manufacturing towns where ladies are employed as shop-girls, sewing-girls, sales-women, and the like it is an important desideratum to carry a noonday-lunch with them to their places of business, and to afford means to do this most conveniently and with the greatest amount of comfort is the object of my invention.

In the present device I propose to afford means not only for carrying different articles of food by themselves, but also means for carrying tea or coffee, the heat of which serves to keep the hands of the wearer warm during the passage. The receptacle for the liquid may be removable, in order that it may be placed upon the heater, stove, or the like to heat the contents during the lunching-hour. The device as an entirety is compact and neat, may be ornamented to suit different tastes, and manufactured at prices to suit all classes.

The invention consists in a liquid-holding vessel of such form as to be most convenient, preferably curved, and having an inlet or outlet aperture, or both, and a receptacle for solids having a sliding or hinged door. The concave portions of these parts are arranged inward to accommodate the hands of the wearer, and they are secured together by a covering at the top, or by hinges. The receptacles, which are suitably covered and lined, are connected together at their lower ends.

The invention is fully illustrated in the accompanying drawings, in which Figure 1 is a perspective view of my invention, and Fig. 2 is a central vertical section.

Referring to the drawings, A represents the liquid-holding receptacle, having aperture *a*, and B a similar receptacle, having a hinged or sliding door, *b*. These receptacles are covered by cloth or other suitable material, and their upper portions are hinged by said covering C, a portion, D, connecting their lower ends. G represents a quilted lining.

E represents the cord, adapted to pass around the neck of the wearer.

Modifications in details of construction may be made without departing from the principle or sacrificing the advantages of this invention, the essential features of which are two receptacles covered and arranged to serve as and for the purposes specified.

What I claim as new, and desire to secure by Letters Patent, is—

1. A lunch-receptacle consisting of two covered receptacles joined at their upper and lower extremities, leaving an intermediate space, thus adapting the device for use as a lunch-box and muff, substantially as specified.

2. A combined lunch-receptacle and muff consisting of a lunch-receptacle in one portion and a water-tight vessel in the other portion, connected at their upper and lower extremities, and provided with an intermediate space for the hands, the whole adapted to serve as and for the purpose set forth.

3. The vessel A *a* and receptacle B *b*, combined with the muff C G, portion D, and cord E, as set forth.

In testimony whereof I affix my signature in presence of two witnesses.

SARAH A. CUNINGHAM.

Witnesses:
 MARY KELLY,
 THOS. H. HORTON.